UNITED STATES PATENT OFFICE.

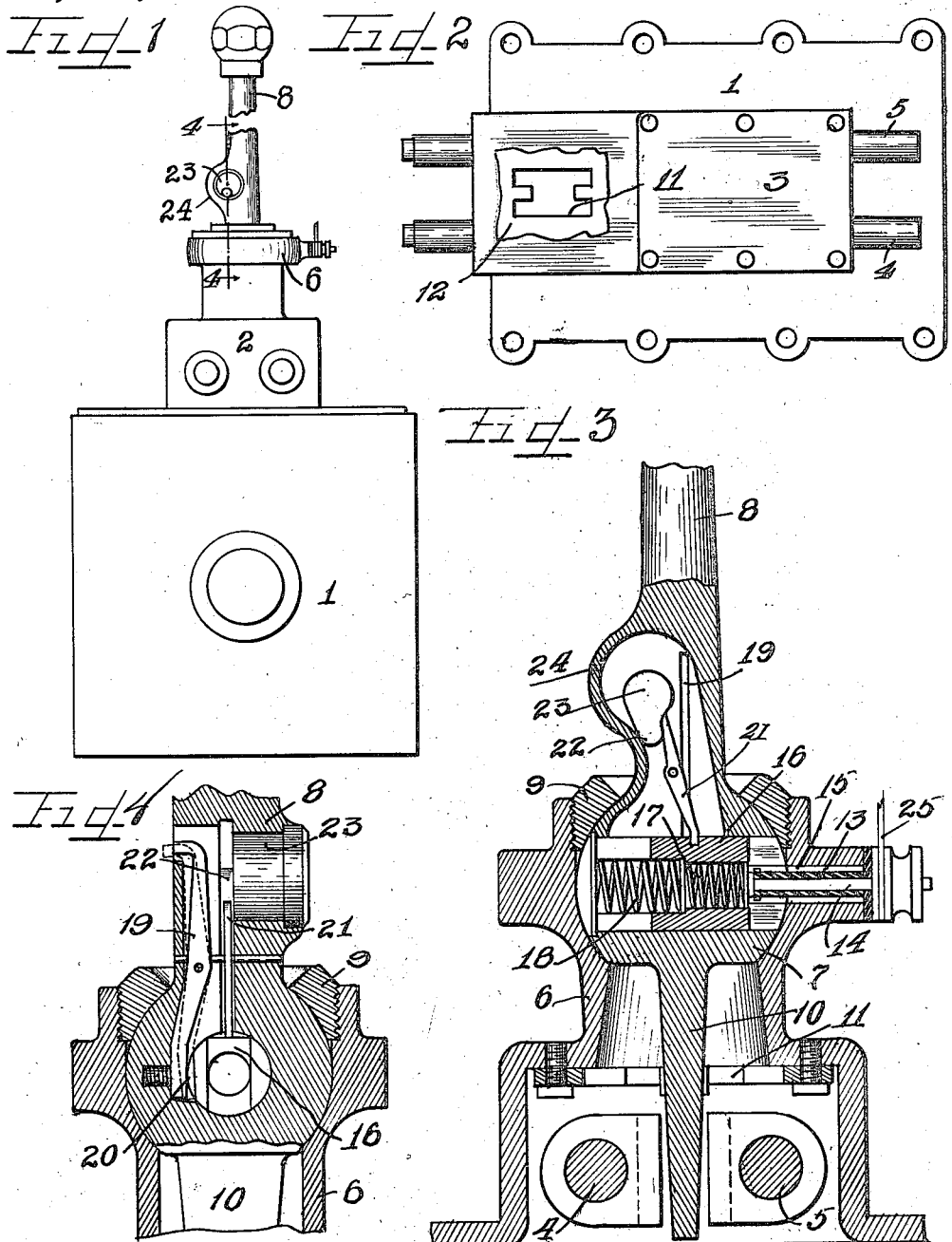

JOHN H. IMHOFF, OF CHAZY, NEW YORK, ASSIGNOR, BY MESNE ASSIGNMENTS, TO JOHNSON AUTOMOBILE LOCK CO., OF CHICAGO, ILLINOIS, A CORPORATION OF ILLINOIS.

GEAR-SHIFT AND IGNITION LOCK.

1,272,449.  Specification of Letters Patent.  Patented July 16, 1918.

Original application filed February 21, 1916, Serial No. 79,642. Divided and this application filed November 27, 1916. Serial No. 133,732.

*To all whom it may concern:*

Be it known that I, JOHN H. IMHOFF, a citizen of the United States, and a resident of the village of Chazy, in the county of Clinton and State of New York, have invented certain new and useful Improvements in Gear-Shift and Ignition Locks; and I do hereby declare that the following is a full, clear, and exact description of the same, reference being had to the accompanying drawings, and to the numerals of reference marked thereon, which form a part of this specification.

This application constitutes a division of my pending application for patent for "gear shift and ignition lock", filed February 21, 1916, Serial No. 79,642.

This invention relates to a lock for the shift lever of a gear shift on a motor car or other mechanism. In most types of motor cars a ball and socket type of gear shift is used, and shifting of gears is accomplished by merely rocking the lever in its ball and socket connection. Owing to the simplicity of design of this type of construction, it has been difficult to apply a convenient external locking device thereto, for instance a padlock. Furthermore, the use of external locking devices on a gear shift lever is objectionable, owing to the accessibility of the lock for damage or destruction by persons unauthorized to use the car.

It is an object therefore of this invention to provide a self-contained locking device for a ball and socket type of gear shift lever requiring merely the insertion of a key into the connection to unlock the same, and with the mechanisms so constructed that by the simple release of a small lever for the purpose, the gear shift lever may be locked when desired without necessitating the use of the key.

It is also an object of this invention to provide a lock for the shift lever of a gear shift requiring only the insertion of a key into the universal joint connection of the lever to release the same when locked.

It is furthermore an object of this invention to provide a self-contained key-operated lock for a gear shift lever of a motor car gear shift wherein, with the lever moved into neutral position, the lock may be manually released without the use of a key to lock said lever, and only unlocked by insertion of a key to retract the locking mechanism and adjusting the same before withdrawal of the key to permit automatic latching thereof without the use of a key for the purpose.

It is finally an object of this invention to construct a lock for a gear shift lever and ignition system which is self-contained and concealed within the mechanisms of the lever and its mounting and which operates automatically to lock the lever when so desired in neutral position, and is only releasable by insertion and actuation of a key for the purpose.

The invention (in a preferred form) is illustrated in the drawings and hereinafter more fully described.

In the drawings:

Figure 1 is an elevational view partly broken away showing a gear shift and shift lever equipped with a lock embodying the principles of my invention.

Fig. 2 is a fragmentary top plan view of the gear shift with the shift lever and its connection to the gear shift removed and broken away to show the interior of the upper portion of the gear shift mechanism.

Fig. 3 is a central vertical section through the device.

Fig. 4 is an enlarged fragmentary detail section taken on line 4—4 of Fig. 1, with parts omitted and parts shown in elevation.

As shown in the drawings:

The transmission case of the gear shift is denoted as a whole by the reference numeral 1, and formed on the cover thereof is a housing 2, provided with cover plates 3, and containing the slidable shift rods 4 and 5, by which movements of the gears within the transmission case 1, are effected. Formed integrally with the forward cover plate 3, and projecting upwardly therefrom is a hollow globular or socket receptacle casing 6. Seated movably within the socket casing member 6, is the rounded hollow ball end 7, of a gear shift lever 8, the same being retained in said socket member 6, by a collar 9, threaded into the upper end of said member 6. Below the globular or ball end 7, of the shifting lever, an integral downwardly projecting tail member 10, is provided, capable of being oscillated through an H-slot 11, in a plate 12, which is secured beneath the socket member 6, on the underside of the cover plate 3. The H-slot 11, represents the field of operation of the tail member 10, in its oscillating movement for co-action with the rods 4 and 5, to shift the transmission gears.

An insulating bushing 13, for a conductor 14, is mounted through one side of the socket casing 6, and within a cylinder 15. The lower ball end of the gear shift lever 8, is cored out on its interior, and transversely slidable therewithin is a locking block 16, having a cylindrical recess in one end thereof adapted to engage over the cylinder 15, at the same time closing the circuit through coiled springs 17 and 18, respectively, mounted on the interior of said block, with the terminal conductor 14. When the slidable block 16, is retracted against the compression of the springs 17 and 18, a spring impelled pivoted lever 19, mounted on the interior or cored out portion of the ball end of the lever 8, latches into engagement with a notch 20, provided in the side of the block 16, as shown in Fig. 4, to hold the same retracted until released by thrusting the upper end of said lever 19, from the dotted line position shown in Fig. 4, into the full line position. Also pivoted within the hollow interior of the ball end of the gear shift lever, is a retracting lever 21, the lower end of which is loosely engaged with a notch in the upper side of the block 16, and the upper end of which is adapted to co-act with and be shifted by the extension or projection 22, on the lock cylinder 23, of the lock, which is rotatably mounted in a cylindrical portion 24, formed in the lever 8. A conductor 25, is connected to the insulated conductor member 14, whereby the ignition circuit may be grounded by grounding said member 14. The locking block 16, which is horizontally slidable, is held retracted against the compression of the springs 17 and 18, by the latch lever 19, which may be released by thrusting the upper end thereof inwardly into the full line position shown in Fig. 4, whereupon said locking block 16, engages over the end of the cylinder 15, thereby locking the ball end 7, of the gear shift lever 8, within the socket casing 6. Retraction of said locking slide block 16, is effected by inserting the key into the lock and rotating the cylinder 23, so that the projection 22, will actuate the retracting lever 21, to return the block to unlocked position, whereupon the same is engaged by the spring impelled latch lever 19, and so held. The movement of the block 16, over the end of the cylinder 15, serves further to ground the conductor 25, which leads to the ignition system of the motor, so that a gear lock as well as ignition lock is thus afforded.

I am aware that various details of construction may be varied through a wide range without departing from the principles of this invention, and I therefore do not purpose limiting the patent granted otherwise than necessitated by the prior art.

I claim as my invention:

1. In a device of the class described the combination with a gear shift lever, of spring actuated means slidable transversely in the lever to lock the same from movement, and spring actuated means within said lever normally holding said locking pin retracted to permit actuation of the lever.

2. In a device of the class described the combination with a gear shift lever, of a block transversely slidable therein, mechanism therein adapted to project the block outwardly, and means rigidly mounted at one side of said lever adapted to receive said block engaged therewith to lock the lever from movement.

3. In a device of the class described the combination with a gear shift lever, of a block slidable therein, springs within said block for moving the same into locking position, spring actuated means normally holding said block retracted, a key operated lock for positively retracting said block, and rigid means mounted adjacent said lever adapted to receive said block engaged therewith when released by said means and actuated by said springs to lock the lever from movement.

4. In a device of the class described the combination with a gear shift lever, and a ball and socket connection therefor, of means slidably mounted within said lever, resilient means therein for impelling the same into locking position, means with which said first mentioned means is adapted to be projected into engagement to lock the lever from movement, and a key operated means for retracting said first mentioned means into unlocked position.

5. In a device of the class described the combination with a gear shift lever, of rigid means associated therewith, mechanism slidable in said lever to interlock with said means, springs within said mechanism adapted to hold the same in locked position, and lock operated means adapted to move said mechanism into unlocked position.

6. In a device of the class described the combination with a gear shift lever, of a locking device therein at the point of pivotal connection thereof comprising lock operated means manually releasable to lock said lever from movement, resilient means within said locking device adapted to move the same into locking position when released.

7. In a device of the class described the combination with a gear shift lever, of transversely slidable locking mechanism therein comprising manually releasable spring impelled locking means operating when released to lock said gear shift lever from movement, and a lock operated mechanism within said lever for retraction of said locking mechanism to unlock the gear shift lever.

8. In a device of the class described the combination with a gear shift lever, of a transversely slidable block adapted to lock the lever from movement, springs therein for holding the same in locked position, and key operated means associated therewith to unlock said lever.

In testimony whereof I have hereunto subscribed my name in the presence of two subscribing witnesses.

JOHN H. IMHOFF.

Witnesses:
W. R. COOPER,
S. M. MCCREA.